(12) United States Patent
Lee

(10) Patent No.: US 6,354,746 B1
(45) Date of Patent: Mar. 12, 2002

(54) PLUG AND RECEPTACLE CONNECTION FOR OPTICAL FIBER CABLES

(75) Inventor: Hsin Lee, Issaquah, WA (US)

(73) Assignee: Fiberon Technologies, Inc., Issaquah, WA (US)

( * ) Notice: Subject to any disclaimer, the term of this patent is extended or adjusted under 35 U.S.C. 154(b) by 0 days.

(21) Appl. No.: 09/575,873

(22) Filed: May 22, 2000

(51) Int. Cl.$^7$ ................................................. G02B 6/36
(52) U.S. Cl. ............................. 385/77; 385/60; 385/73; 385/78; 385/92
(58) Field of Search ................. 385/58, 60, 70–73, 385/75, 76, 78, 92, 77

(56) References Cited

U.S. PATENT DOCUMENTS

| | | | |
|---|---|---|---|
| 4,762,388 A | * 8/1988 | Tanaka et al. | 350/96.2 |
| 5,333,222 A | * 7/1994 | Belenkiy et al. | 385/70 |
| 5,348,487 A | * 9/1994 | Marazzi et al. | 439/138 |
| 5,359,688 A | * 10/1994 | Underwood | 385/70 |
| 6,019,521 A | * 2/2000 | Manning et al. | 385/77 |
| 6,130,977 A | * 10/2000 | Rosson | 385/76 |
| 6,247,849 B1 | * 6/2001 | Liu | 385/55 |

* cited by examiner

Primary Examiner—Akm E. Ullah
Assistant Examiner—Jennifer Doan
(74) Attorney, Agent, or Firm—Delbert J. Barnard

(57) ABSTRACT

A closure wall (30) is pivotally connected to a pair of opposite sidewalls (48, 50) by pivot pins (68) carried by the closure wall bracket (38) and pivot pin receiving openings (74) in the sidewalls (48, 50). The pivot pins (68) are connected to the closure wall (38) by pivot pin supporting arms (62, 64). These arms (62, 64) are connected to side portions (56, 58) of the closure wall (38) adjacent open ends of splits (40, 42) that separate the side portions (56, 58) from the central portion (60). The pivot pins (68) and pivot pin receiving openings (74) are offset from end surfaces (78, 80, 82, 84) on the socket sidewalls (48, 50, 70, 72) the distance x. They are also offset from the outer surface of the sidewall (72). Sidewall (72) intersects end wall (82) at a line (L).

20 Claims, 6 Drawing Sheets

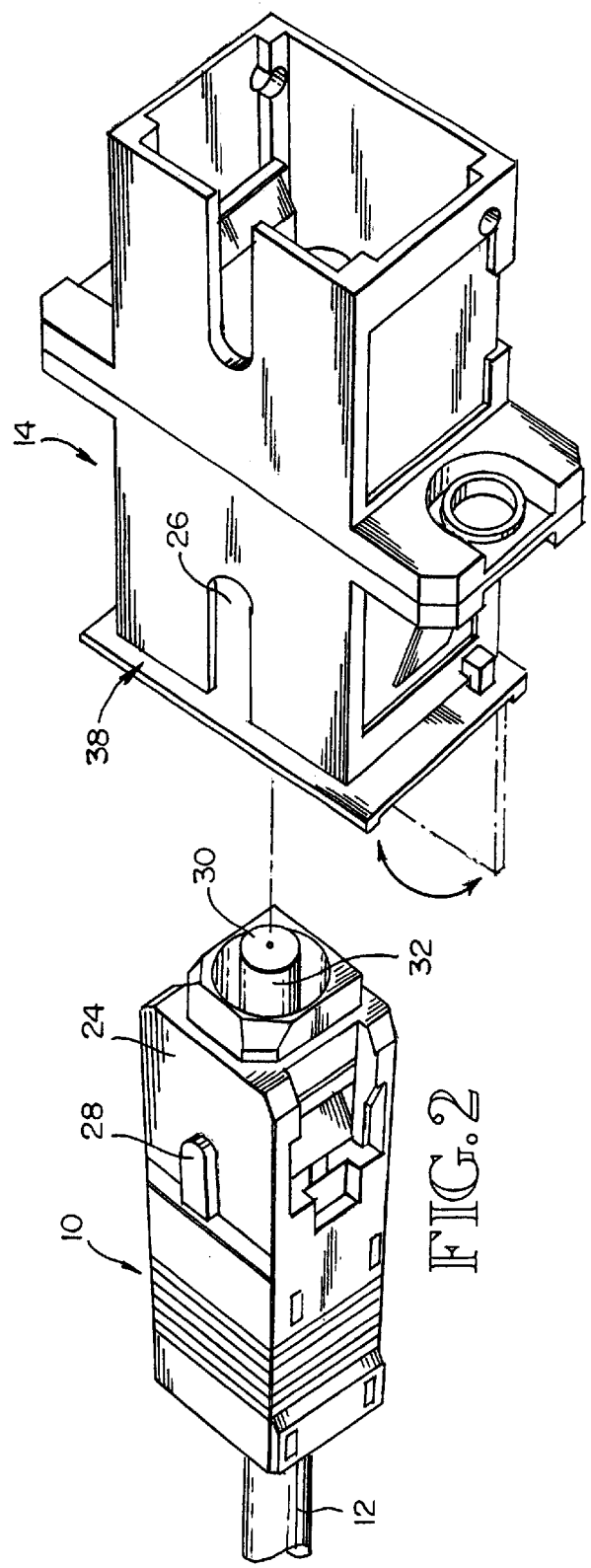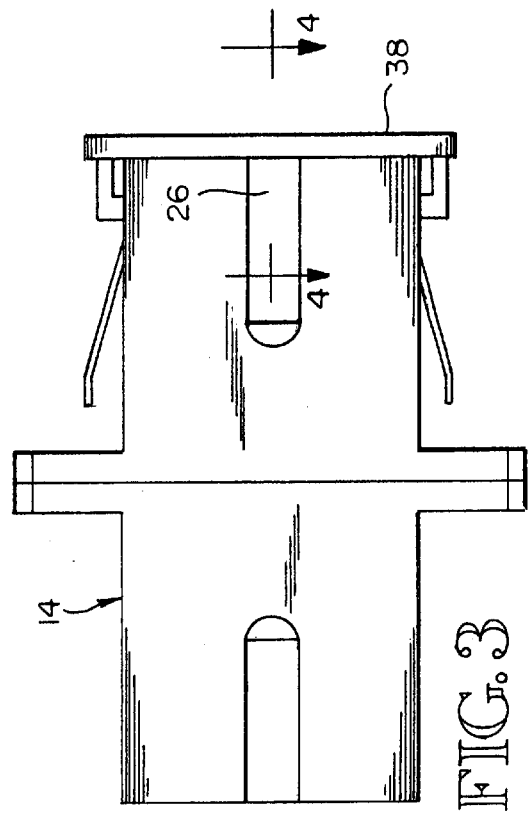

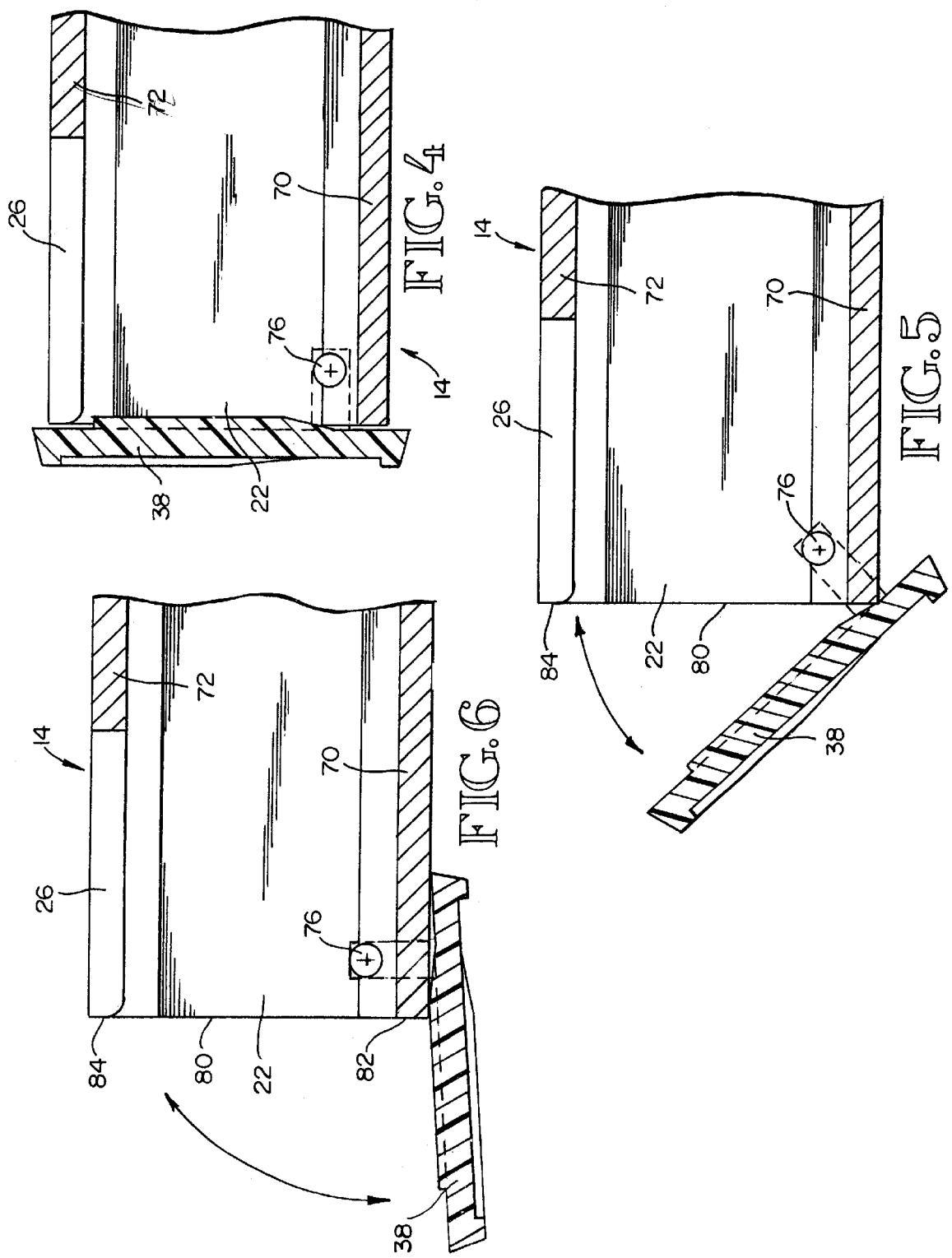

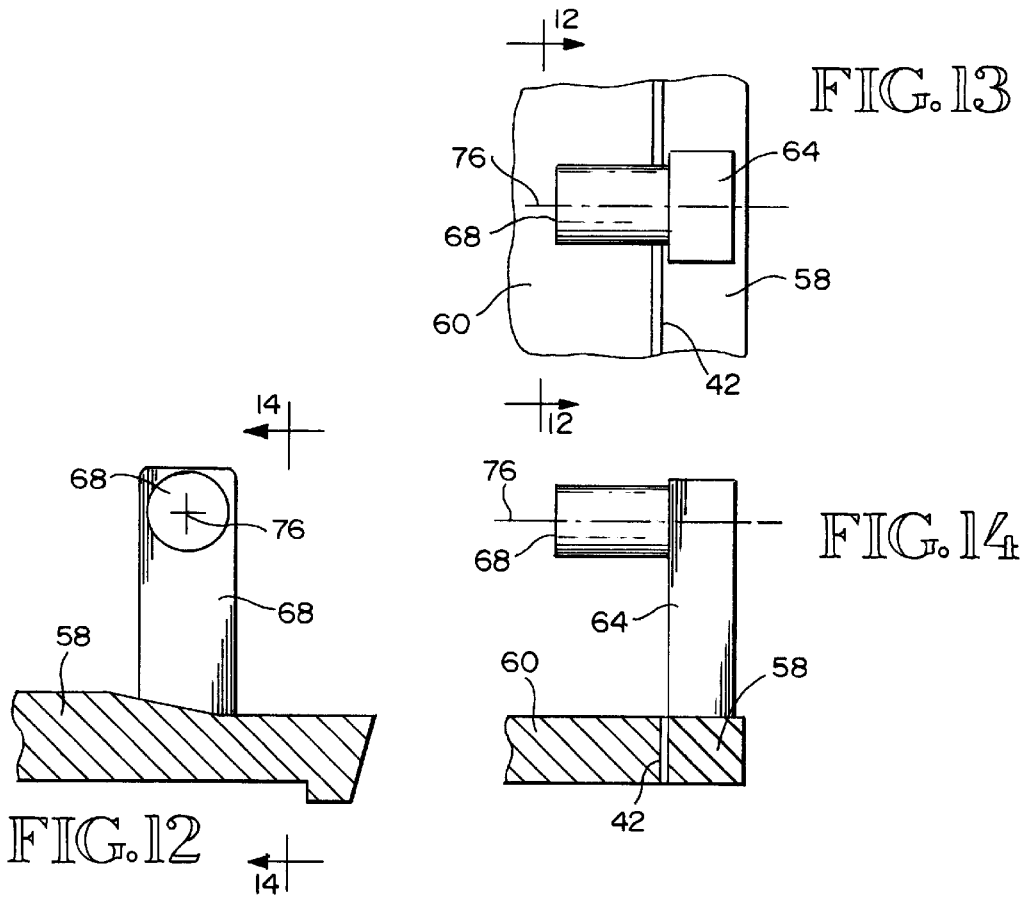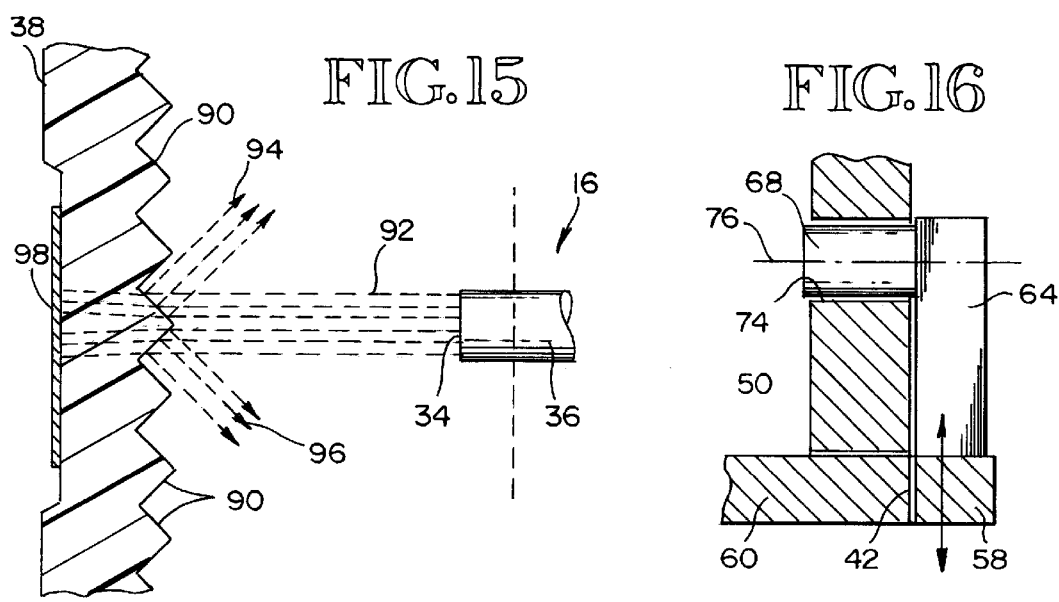

PLUG AND RECEPTACLE CONNECTION FOR OPTICAL FIBER CABLES

TECHNICAL FIELD

This invention relates to fiber optics technology. More particularly, it relates to the provision of plug and receptacle connections for joining two fiber optics cables for optical energy transmission, and to the provision of a closure wall or door for a socket opening in the receptacle through which the plug moves when it is being connected to and disconnected from the receptacle, and to a construction of the closure wall that results in it being held both open and closed without the use of a separate coil spring.

BACKGROUND OF THE INVENTION

It is common to join the ends of two fiber optics cables by the use of a connection composed of a plug at an end of one of the cables and a plug receiving receptacle at an end of the other cable. The receptacle includes a base and a plug receiving socket extending axially from the base. An end portion of a first cable is secured to the base with the end of its optic fiber directed axially of the socket. An end portion of the second or other cable is secured to the plug with the end of its optic fiber also directed axially. When the plug is inserted into the socket, the ends of the two optic fibers are moved together, to form a light energy transmitting coupling of each to the other.

It is known to provide the socket with a closure wall or door at its end through which the plug enters and leaves the socket. Prior art closure walls are hinge connected to the socket by the use of pivot pins carried by the closure wall and pivot pin receiving openings carried by the socket. A torsion spring of helical coil form is provided for biasing the closure wall into its closed position. One end of the torsion spring is anchored on the socket and the other end is anchored on the closure wall. When the closure wall is moved from its closed position to its open position, energy is stored in the coil spring. When the moving force is removed from the closure wall, this stored energy acts to move the closure wall back into its closed position and hold it there.

The use of a torsion spring adds to the manufacturing cost of the connection. There is a desire to reduce manufacturing costs. There is also a desire to provide a connection in which the closure wall is biased open and well as closed. A primary object of the present invention is to satisfy both of these desires.

BRIEF SUMMARY OF THE INVENTION

An aspect of the present invention is to provide an improved receptacle component of a connection for two optical fiber cables that also includes a plug that is received in the receptacle. The receptacle comprises four sidewalls together forming a plug receiving socket having an open end through which a plug enters and leaves the socket. The four sidewalls include first and second opposite sidewalls, third and fourth opposite sidewalls that are perpendicular to the first and second sidewalls, and end surfaces on said sidewalls at the open end of the socket. The fourth sidewall has an outer surface. The first and second sidewalls include coaxial, pivot pin receiving openings that extend through them near their end surfaces, and near the fourth sidewall. The pivot pin receiving openings have axes that are spaced inwardly from the end surfaces of the first and second sidewalls the distance x and are spaced inwardly of the outer surface of the fourth sidewall a distance y. The end surface on the fourth sidewall intersects the outer surface of the fourth sidewall along an intersecting line L that is parallel to the axes of the pivot pin receiving openings. The line L is spaced from the axes of the pivot pin receiving openings a distance z that is greater than the distance x and greater than the distance of y. A closure wall is provided for the open end of the socket. The closure wall includes a pair of pivot pin support arms projecting from it and laterally inwardly projecting pivot pins on the support arms. The pivot pins are sized and positioned to be received within the pivot pin receiving openings. The support arms are of a length that places the pivot pin axes away from the inner surface of the closure wall a distance that is substantially equal to or greater than the distance x, and substantially equal to or greater than the distance y, and smaller than the distance z. When in its closed position, the closure wall extends across the open end of the socket and its inner surface substantially contacts the end surfaces of at least two of the sidewalls. When the closure wall is in its open position, its inside surface substantially contacts the outer surface of the fourth sidewall. The support arms for the pivot pins are mounted to allow movement of the closure member from its open position to its closed position and from its closed position to its open position.

According to an aspect of the invention, the closure wall includes a central portion and opposite side portion that are separated from the central portion by parallel splits that are also parallel to the first and second sidewalls. The splits have open ends that are adjacent the end surface of the third sidewall when the closure wall is in its closed position. The splits also have closed ends that are adjacent the end surface of the fourth sidewall when the closure wall is in its closed position. The support arms for the pivot pins are connected to the side portions of the closure wall adjacent the open ends of the splits, laterally outwardly of the splits. As a result, rotation of the closure wall between its open and closed positions will cause flexing of the central portion of the closure wall relative to the side portions, so as to allow the closure wall to slide over and around the intersection line L as the closure wall is moved from one of its positions to the other.

Preferably, the end surfaces of the four sidewalls substantially lie in a common end plane that is perpendicular to the outer surface of the fourth sidewall. Preferably also, the closure wall is constructed such that when it is in its open position it extends at an angle to said end plane that is greater than ninety degrees. The closure wall contacts the end surfaces of at least two of the sidewalls when the closure wall is in its closed position. This contact and the length of the support arms holds the closure wall in its closed position whereat it will stay until forcibly swung from its closed position to its open position. When the closure wall is in its open position, its inside surface substantially contacts the outer surface of the fourth sidewall. This contact and the length of the support arms holds the closure wall in its open position whereat it will stay until forcibly swung from its open position to its closed position.

In preferred form, the receptacle includes a base from which the plug receiving socket extends. The base supports an end portion of a first fiber optic cable, with its optic fiber directed axially of the socket. According to an aspect of the invention, an inside portion of the closure wall is provided with an array of reflecting surfaces that are positioned to reflect substantially obliquely outwardly, any light energy that may be omitted from the first optical cable towards the closure wall when the closure wall is closed, so that said light energy will not be reflected back on itself.

Preferably, the closure wall is constructed from a structural plastic material, facilitating its manufacture and also facilitating the flexing of the central portion of the closure wall that must occur when the closure wall is moved from its open position to its closed position and from its closed position to its open position. Plastic materials that may be suitable to provide reduced manufacturing costs, and the desired amount of flexing, may want to transmit light energy that might be directed on it. A further aspect of the invention is to provide the closure wall with a light blocking material on its outer surface, adapted to substantially prevent light energy from being transmitted through the closure wall.

Other objects, advantages and features of the invention will become apparent from the description of the best mode set forth below, from the drawings, from the claims and from the principles that are embodied in the specific structures that are illustrated and described.

BRIEF DESCRIPTION OF THE SEVERAL VIEWS OF THE DRAWING

In the drawings, like reference numerals are used to designate like parts throughout the several views and:

FIG. 2 is a view similar to FIG. 1 but taken from a different aspect and showing the closure wall in its closed position;

FIG. 3 is a top plan view of the receptacle shown in FIGS. 1 and 2;

FIG. 4 is a fragmentary longitudinal sectional view taken substantially along line 4—4 of FIG. 3;

FIG. 5 is a view like FIG. 4 but showing the closure wall positioned between its closed and open positions;

FIG. 6 is a view like FIGS. 4 and 5, but showing the closure wall in its open position;

FIG. 12 is a sectional view taken substantially along line 12—12 of FIG. 13;

FIG. 13 is a plan view of FIG. 12;

FIG. 14 is a sectional view taken substantially along line 14—14 of FIG. 12;

FIG. 15 is a diagram showing light energy diverting surfaces that are on the inner side of the closure wall functioning to divert light energy and further showing a light energy blocking member that is on the outside of the closure wall functioning to block light energy; and FIG. 16 is a view like FIG. 14, but showing the pivot pin within a pivot pin receiving opening in a sidewall of the receptacle.

DETAILED DESCRIPTION OF THE INVENTION

Figure 1:
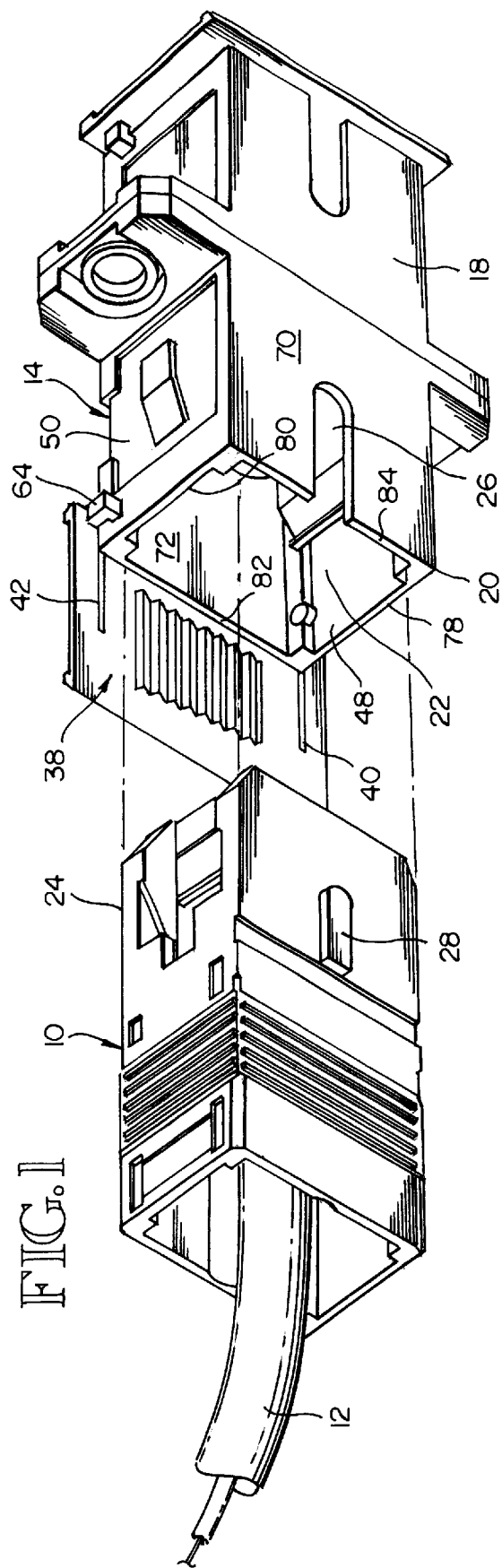
FIG. 1 is an exploded pictorial view of a plug and receptacle connection for fiber optic cables, such view looking towards the open end of a plug receiving socket in the receptacle, and showing a closure wall for such open end in its open position.
Figure 8:
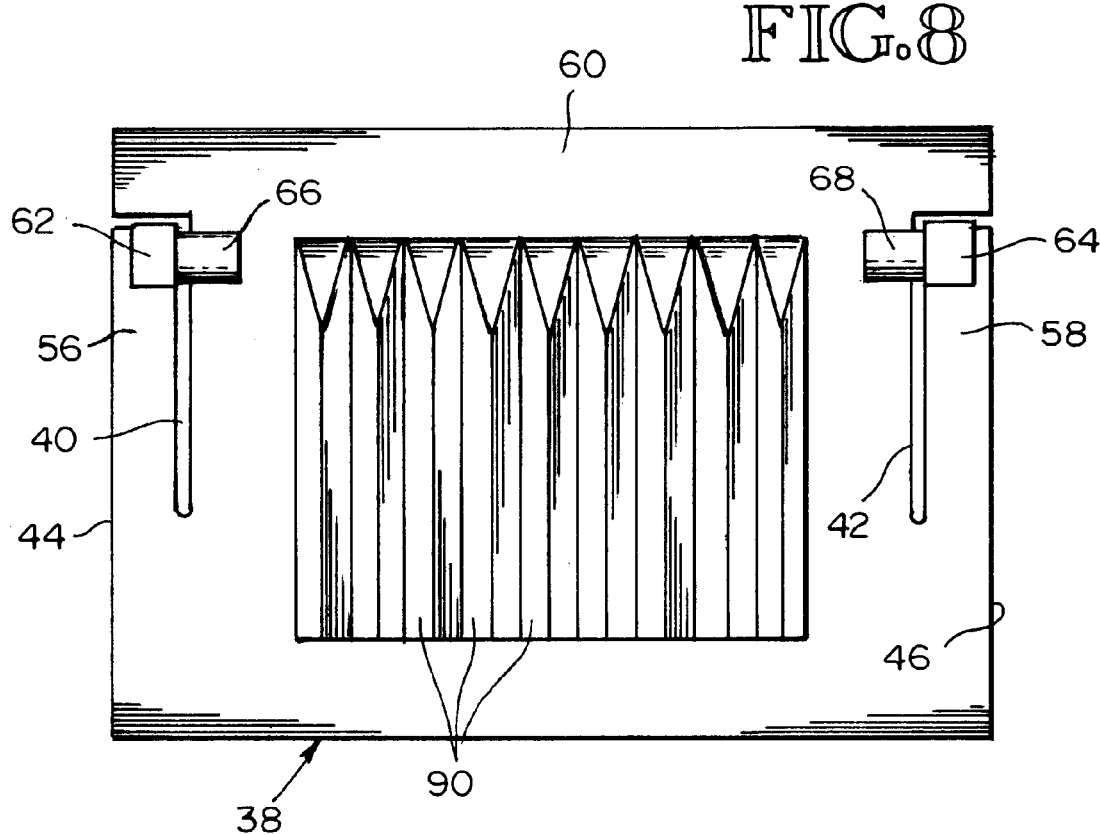
FIG. 8 is an end view looking towards the inner side of the closure wall.
Figure 7:
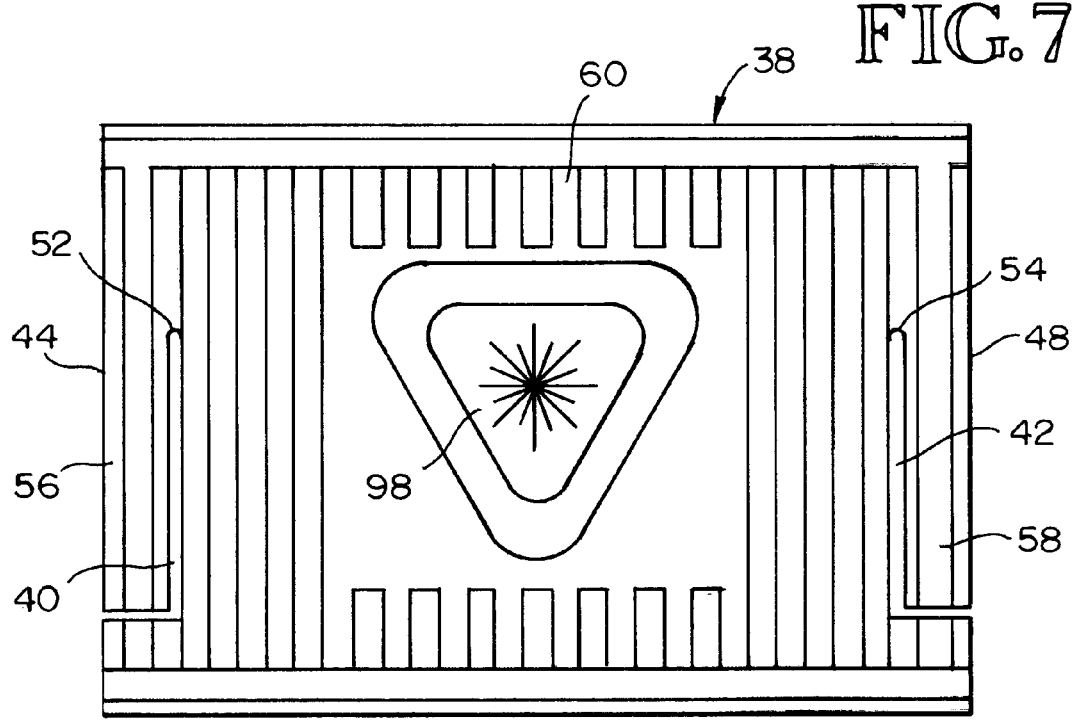
FIG. 7 is an end view looking towards the outer side of the closure wall.

FIGS. 1 and 2 show a plug 10 on an end of an optical cable 12 and a receptacle 14 that supports an end of a second optical cable 16 (FIG. 15). Receptacle 14 includes a base 18 in which the end portion of the optical cable 16 is secured. A socket 20 extends axially outwardly from the base 18 and includes an open end 22 through which an end portion 24 of the plug 10 extends during connection and disconnection of the plug 10 to and from the socket 20. As is conventional per se, a slot 26 is provided in a sidewall of the socket 20 and is sized to receive a projection 28 that is on a side end portion 24 of the plug 10. When the plug end portion 24 is within the socket 20, the projection 28 is within the slot 26. When the plug 10 is within the socket 20, the end 30 of an optic fiber 32 that is within cable 12 is positioned substantially against an end surface 34 of an optic fiber 36 that is apart of the cable that is supported by the base of the receptacle 14. This positioning of the two optical fibers 32, 36 provides an optical energy transmitting coupling of the cables 12, 16.

It is desirable to provide the open end 22 of the socket 20 with a closure wall or door 38 that closes the outer end of the socket 20 when the plug 10 is not within the socket 20. Prior art closure walls are biased into a closed position by a helical coil torsion spring. This spring is coaxial to a pivot axis provided by pivot pins that are supported from the closure wall and pivot pin receiving openings that are carried by the socket. One end of the coil spring is anchored to the closure wall and the other end of the coil spring is anchored to the receptacle. The coil spring is adapted to bias the closure wall into a closed position. When a force is applied to the closure wall, swinging it from its closed position to its open position, energy is stored in the torsion spring. When the force is removed from the closure wall, this energy returns the closure wall to its closed position.

A feature of the present invention is to eliminate the torsion spring and to instead provide the closure wall 38 with a built in spring that functions to bias the closure wall 38 in its open position (FIG. 6) as well as its closed position (FIG. 4).

As shown by FIGS. 1, 7, 8, 13, 14 and 16, the closure wall 38 may have a substantially rectangular plan form. It includes a pair of parallel splits 40, 42 that are also parallel to side edges 44, 46 of the closure wall 38 and are parallel to opposite sidewalls 48, 50 of the socket 20. The splits 40, 42 have open ends, i.e. ends that break an outer surface of the closure wall 38. They also have closed opposite ends 52, 54. The splits 40, 42 divide the closure wall 38 into a pair of opposite side portions 56, 58 and a central portion. The side portions 56, 58 are integral with the central portion 60 in the region that is endwise outwardly of the closed ends of the splits 40, 42.

According to the present invention, a pair of pivot pins support arms 62, 64 are connected to the side portions 56, 58 of the closure wall 38, adjacent the open ends of the splits 40, 42. The pivot pin support arms 62, 64 support coaxial pivot pins 66, 68. The socket portion 20 of the receptacle 14 has a first pair of opposite sidewalls 48, 50 and a second pair of opposite sidewalls 70, 72. In the illustrated embodiment, the walls 48, 50 are parallel to each other, and to the splits 40, 42. The walls 70, 72 are parallel to each other and are perpendicular to the walls 48, 50 and the splits 40, 42. The first pair of socket sidewalls 48, 50 include pivot pin receiving openings that are sized to receive the pivot pin 66, 68. One of these openings 74 is shown in FIG. 16. The other opening is in wall 48, and is identical to opening 74 and thus need not be and is not separately illustrated. The pivot pin openings are coaxial and when the pivot pins 66, 68 are in them, the pivot pins 66, 68 and the pivot pin openings provide a pair of pivot pin connections that share a single pivot axes 76.

Figure 11:
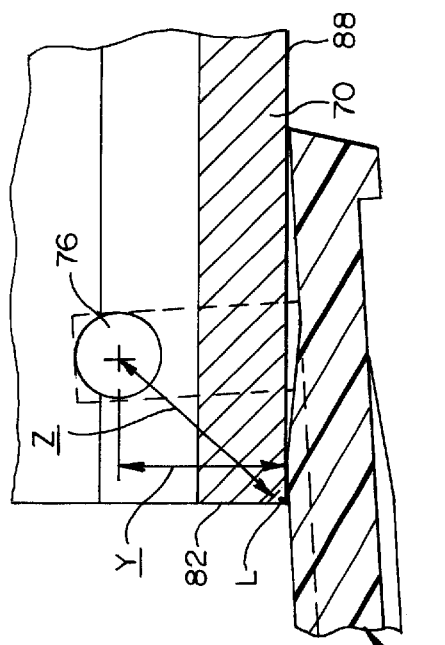
FIG. 11 is a view like FIGS. 9 and 10, but with the closure wall in the position shown by FIG. 6.
Figure 10:
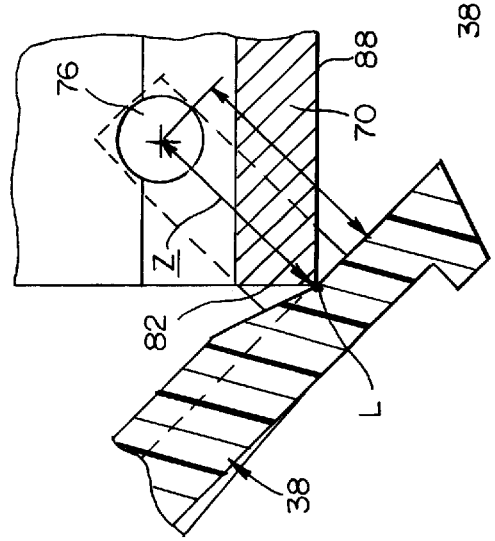
FIG. 10 is a view like FIG. 9 but with the closure wall in the position shown in FIG. 5.
Figure 9:
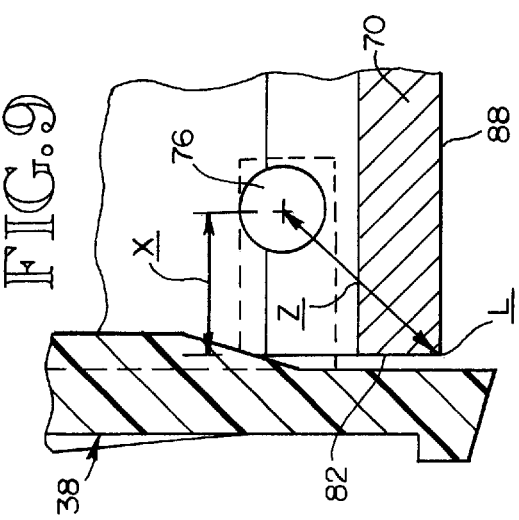
FIG. 9 is an enlarged scale view of the portion of FIG. 4 that includes the pivot pin connection.

The receptacle sidewalls 48, 50, 70, 72 have outer end surfaces 78, 80, 82, 84 (FIG. 1) which preferably lie in a common plane, or at least have closure wall contacting portions that are in a common plane. When the closure wall 38 is in its closed position, it contacts at least two of the end surfaces 78, 80, 82, 84. When the closure wall 38 is in its closed position, an inner surface portion of the closure wall 38 is spaced from the pivot axis 76 a distance x (see FIG. 9, for example). When the closure wall 38 is in its open position, a portion of the inside of closure wall 28 is spaced from the pivot pin axis 76 a distance y (as shown by FIG. 11, for example). The outside surface 88 of receptacle sidewall intersects the end surface 82 of wall 76 along an intersection line L (FIGS. 9–11) that is parallel to the pivot axis 76. A distance z between pivot pin axes 76 and intersection line L is greater than distance x and is also greater than distance y. As a result, when the closure member 38 is in its closed position, it is held in this closed position by the pivot pin support 62, 64 and its contact with two or more of the end surfaces 78, 80, 82, 84. When the closure member 38 is in its open position, its inner surface contacts the outer surface 88 wall 70. This contact and the length of the pivot pin supports 62, 64 holds the closure member 38 in this open position. In order for the closure member 38 to be moved from its closed position to its open position and from its open position to its closed position, the inner surface of closure wall 38 that contacts the intersection line L must be caused to slide over and around the intersection line L. This is possible because the pivot pin support arms 62, 64 are located outwardly of the splits 40, 42. The central portion 60 of the closure wall 68 is what contacts the intersection line 60. Thus, as the closure wall 38 is swung from its closed position to its open position and from its open position to its closed position, the central portion 60 of the closure wall 38 will flex relative to the side portions 48, 50 and allow the movement.

As shown by FIGS. 6 and 11, the inner surface of the closure wall 38 is shaped such that when the closure wall 38 is in its open position, it will extend at an angle to the end surfaces 78, 80, 82, 84 that is greater than ninety degrees. This facilitates insertion of the plug 10 into the socket opening.

Preferably, the inner surface of the closure wall 38 is provided with intersecting diagonal surfaces 90 that function to reflect light energy 92 obliquely outwardly along paths 94, 96, as shown by FIG. 15. Thus, if light energy is being transmitted through optic fiber 36 while the closure wall 38 is closed, the light energy 92 will be reflected by the surfaces 90 off to the side rather than back on itself.

Preferably, the closure wall 38 is injection molded from a suitable structural plastic as injection molding is an economical way of making a part. Also, in the case of the present invention, it makes possible the required flexing action of the central portion 60 of closure wall 38 relative to the side portions 56, 58. A plastic that is otherwise suitable may tend to transmit some of the optical energy that is imposed on it. To prevent this from happening, a layer 98 of a suitable opaque material may be secured to the outer surface of closure wall 38. For example, a suitable metal foil, e.g. aluminum, may be glued on to the central outer portion of the closure wall 38. This portion of the closure wall 38 may be recessed, as shown by FIG. 15.

The closure wall 38 may be mounted onto an adapter that is slipped onto the socket portion of the receptacle 14. The adapter would have four sidewalls corresponding to the sidewalls 48, 50, 70, 72 of the socket. The adapter would fit onto the socket in telescopic fashion, with the socket fitting into the adapter, with each sidewall 48, 50, 70, 72 of the socket being positioned inwardly contiguous a corresponding sidewall of the adapter. Herein, the terms "four sidewalls", "first and second opposite sidewalls" and "third and fourth opposite sidewalls" are used to mean both single thickness sidewalls of the socket itself or double thickness sidewalls composed of the socket sidewalls and the attachment sidewalls.

The illustrated embodiments are only examples of the present invention and, therefore, are non-limitive. It is to be understood that many changes in the particular structure, materials and features of the invention may be made without departing from the spirit and scope of the invention. Therefore, it is my intention that my patent rights not be limited by the particular embodiments illustrated and described herein, but rather determined by the following claims, interpreted according to accepted doctrines of claim interpretation, including use of the doctrine of equivalents and reversal of parts.

What is claimed is:

1. A receptacle for a plug on an end of an optical fiber cable, comprising:

four sidewalls together forming a plug receiving socket having an open end through which a plug enters and leaves the socket;

said four sidewalls including first and second opposite sidewalls, third and fourth opposite sidewalls that are perpendicular to the first and second sidewalls, and end surfaces on said sidewalls at the open end of the socket;

said fourth sidewall having an outer surface;

said first and second sidewalls including coaxial, pivot pin receiving openings that extend through them near their end surfaces, and near the fourth sidewall, said pivot pin receiving openings having axes that are axially inwardly from the end surfaces of the first and second sidewalls a distance x and are laterally inwardly of the outer surface of the fourth sidewall a distance y;

wherein the end surface on said fourth sidewall intersects the outer surface of the fourth sidewall along an intersection line L that is parallel to the axes of the pivot pin receiving openings;

wherein the line L is spaced from the axes of the pivot pin receiving openings a distance z that is greater than the distance x and greater than the distance y;

a closure wall for the open end of the socket having a pair of pivot pin support arms projecting from it and a laterally inwardly projecting pivot pin on each said support arms, sized and positioned to be received within said pivot pin receiving openings; and said support arms being of a length that places the pivot pin axes away from the inner surface of the closure wall a distance that is substantially equal to or greater than the distance x, and substantially equal to or greater than the distance y, and smaller than the distance z, whereby the closure wall, in a closed position, extends across the open end of the socket and its inner surface substantially contacts the end surfaces of at least two of the sidewalls, and when it is in an open position, its inside surface substantially contacts the outer surface of the fourth sidewall, and wherein the support arms for the pivot pins are mounted to allow movement of the closure member from its open position to its closed position and from its closed position to its open position.

2. The receptacle of claim 1, wherein the closure wall comprises a central portion and opposite side portions that are separated from the central portion by splits that are parallel to the first and second sidewalls; wherein the splits have open ends that are adjacent the end surface of the third sidewall when the closure wall is in its closed position, and closed ends that are adjacent the end surface of the fourth wall, wherein the support arms for the pivot pins are connected to the side portions of the closure wall adjacent the open ends of the splits, laterally outwardly of the splits, and wherein rotation of the closure wall between its open and closed positions will cause flexing of the central portion of the closure wall relative to the side portions, so as to allow the closure wall to slide over and around the intersection line L as the closure wall is moved from one of its positions to the other.

3. The receptacle of claim 1, wherein with the end surfaces of the four sidewalls substantially lie in a common plane that is perpendicular to the outer surface of the fourth sidewall, and wherein in the closure wall, in its open position, extends at an angle to said plane that is greater than ninety degrees.

4. The receptacle of claim 3 wherein the closure wall contacts the end surfaces of at least two of the sidewalls when the closure wall is in its closed position, and this contact and the length of the support arms holds the closure wall in a closed position wherein it will stay until forcibly swung from its closed position to its open position.

5. The receptacle of claim 1, wherein the closure wall contacts the end surfaces of at least two of the sidewalls when the closure wall is in its closed position, and this contact and the length of the support arms holds the closure wall in a closed position wherein it will stay until forcibly swung from its closed position to its open position.

6. The receptacle of claim 1, wherein the closure wall, including the pivot pin support arms and the pivot pins, is formed from a structural plastic material.

7. The receptacle of claim 6, wherein with the end surfaces of the four sidewalls substantially lie in a common plane that is perpendicular to the outer surface of the fourth sidewall, and wherein the closure wall, in its open position, extends at an angle to said plane that is greater than ninety degrees.

8. The receptacle of claim 7, wherein the closure wall contacts the end surfaces of at least two of the sidewalls when the closure wall is in its closed position, and this contact and the length of the support arms holds the closure wall in a closed position wherein it will stay until forcibly swung from its closed position to its open position.

9. The receptacle of claim 6, wherein the closure wall contacts the end surfaces of at least two of the sidewalls when the closure wall is in its closed position, and this contact and the length of the support arms holds the closure wall in a closed position wherein it will stay until forcibly swung from its closed position to its open position.

10. A receptacle on a first optical cable for receiving a plug on an end of a second optical fiber cable, comprising:
   a base supporting an end portion of the first optical cable;
   four sidewalls together forming a plug receiving socket having a first end connected to said base and an open second end through which a said plug enters and leaves the socket;
   said base supporting said first optical cable with its end spaced from and directed outwardly towards the open end of the socket;
   said four sidewalls including first and second opposite sidewalls, third and fourth opposite sidewalls that are perpendicular to the first and second sidewalls, and end surfaces on said sidewalls at the open end of the socket;
   said fourth sidewall having an outer surface;
   said first and second sidewalls including coaxial, pivot pin receiving openings that extend through them near their end surfaces, and near the fourth sidewall, said pivot pin receiving openings having axes that are axially inwardly from the end surfaces of the first and second sidewalls a distance x and are laterally inwardly of the outer surface of the fourth sidewall a distance y;
   wherein the end surface on said fourth sidewall intersects the outer surface of the fourth sidewall along an intersecting line L that is parallel to the axes of the pivot pin receiving openings;
   wherein the line L is spaced from the axes of the pivot pin receiving openings a distance z that is greater than the distance x and greater than the distance y;
   a closure wall for the open end of the socket having a pair of pivot pin support arms projecting from it and a laterally inwardly projecting pivot pin on each said support arms, sized and positioned to be received within said pivot pin receiving openings; and
   said support arms being of a length that places the pivot pin axes away from the inner surface of the closure wall a distance that is substantially equal to or greater than the distance x, and substantially equal to or greater than the distance y, and smaller than the distance z,
   whereby the closure wall, in a closed position, extends across the open end of the socket and its inner surface substantially contacts the end surfaces of at least two of the sidewalls, and when it is in an open position, its inside surface substantially contacts the outer surface of the fourth sidewall, and wherein the support arms for the pivot pins are movable to allow movement of the closure member from its open position to its closed position and from its closed position to its open position.

11. The receptacle of claim 10, wherein the closure wall comprises a central portion and opposite side portions that are separated from the central portion by splits that are parallel to the first and second sidewalls; wherein the splits have open ends that are adjacent the end surface of the third sidewall when the closure wall is in its closed position, and closed ends that are adjacent the end surface of the fourth wall, wherein the support arms for the pivot pins are connected to the side portions of the closure wall adjacent the open ends of the splits, laterally outwardly of the splits, and wherein rotation of the closure wall between its open and closed positions will cause flexing of the central portion of the closure wall relative to the side portions to allow the closure wall to slide over and around the intersection line L as the closure wall is moved from one of its positions to the other.

12. The receptacle of claim 10, wherein with the end surfaces of the four sidewalls substantially lie in a common plane that is perpendicular to the outer surface of the fourth sidewall, and wherein the closure wall, in its open position, extends at an angle to said plane that is greater than ninety degrees.

13. The receptacle of claim 12, wherein the closure wall contacts the end surfaces of at least two of the sidewalls when the closure wall is in its closed position, and this contact and the length of the support arms holds the closure wall in a closed position wherein it will stay until forcibly swung from its closed position to its open position.

14. The receptacle of claim 10, wherein the closure wall contacts the end surfaces of at least two of the sidewalls when the closure wall is in its closed position, and this contact and the length of the support arms holds the closure wall in a closed position wherein it will stay until forcibly swung from its closed position to its open position.

15. The receptacle of claim 10, wherein the closure wall, including the pivot pin support arms and the pivot pins, is formed from a structural plastic material.

16. The receptacle of claim 15, wherein with the end surfaces of the four sidewalls substantially lie in a common plane that is perpendicular to the outer surface of the fourth sidewall, and wherein the closure wall, in its open position, extends at an angle to said plane that is greater than ninety degrees.

17. The receptacle of claim 16, wherein the closure wall contacts the end surfaces of at least two of the sidewalls when the closure wall is in its closed position, and this contact and the length of the support arms holds the closure wall in a closed position wherein it will stay until forcibly swung from its closed position to its open position.

18. The receptacle of claim 15, wherein the closure wall contacts the end surfaces of at least two of the sidewalls when the closure wall is in its closed position, and this contact and the length of the support arms holds the closure wall in a closed position wherein it will stay until forcibly swung from its closed position to its open position.

19. The receptacle of claim 10, wherein an inside portion of the closure wall has an array of reflecting surfaces positioned to reflect substantially obliquely outwardly any light energy that may be emitted from the first optical cable towards the closure wall when the closure wall is closed, so that said light energy will not be reflected back on itself.

20. The receptacle of claim 10, wherein the closure wall is constructed from a material cable of transmitting some light energy and a layer of a light blocking material is provided on the outer surface of the closure wall, to substantially prevent light energy transmission through the closure wall.

* * * * *